United States Patent
Pappu et al.

(10) Patent No.: US 10,332,506 B2
(45) Date of Patent: Jun. 25, 2019

(54) COMPUTERIZED SYSTEM AND METHOD FOR FORMATTED TRANSCRIPTION OF MULTIMEDIA CONTENT

(71) Applicant: OATH INC., New York, NY (US)

(72) Inventors: Aasish Pappu, Rego Park, NY (US); Amanda Stent, Chatham, NJ (US)

(73) Assignee: OATH INC., New York, NY (US)

(*) Notice: Subject to any disclaimer, the term of this patent is extended or adjusted under 35 U.S.C. 154(b) by 85 days.

(21) Appl. No.: 14/843,185

(22) Filed: Sep. 2, 2015

(65) Prior Publication Data
US 2017/0062010 A1    Mar. 2, 2017

(51) Int. Cl.
| | |
|---|---|
| G10L 15/02 | (2006.01) |
| G10L 15/26 | (2006.01) |
| G11B 27/036 | (2006.01) |
| G06F 17/27 | (2006.01) |
| G11B 27/34 | (2006.01) |
| G10L 15/05 | (2013.01) |
| G11B 27/031 | (2006.01) |
| G11B 27/10 | (2006.01) |

(52) U.S. Cl.
CPC ............. *G10L 15/02* (2013.01); *G10L 15/05* (2013.01); *G10L 15/265* (2013.01); *G11B 27/031* (2013.01); *G11B 27/105* (2013.01); *G10L 2015/025* (2013.01)

(58) Field of Classification Search
CPC ... G11B 27/036; G11B 27/34; G06F 17/2705; G10L 15/02; G10L 15/265; G10L 2015/025
USPC ....................................................... 386/278
See application file for complete search history.

(56) References Cited

U.S. PATENT DOCUMENTS

| | | | | |
|---|---|---|---|---|
| 5,649,060 | A  * | 7/1997 | Ellozy .............. | G06F 17/30746 704/278 |
| 2002/0052740 | A1 * | 5/2002 | Charlesworth ... | G06F 17/30038 704/220 |
| 2002/0178002 | A1 * | 11/2002 | Boguraev ............ | G06F 17/277 704/235 |
| 2012/0078712 | A1 * | 3/2012 | Fontana ............ | G06Q 30/0251 705/14.49 |

* cited by examiner

Primary Examiner — Thai Q Tran
Assistant Examiner — Nien Yang
(74) Attorney, Agent, or Firm — James J. DeCarlo; Greenberg Traurig, LLP

(57) ABSTRACT

Disclosed are systems and methods for improving interactions with and between computers in content searching, generating, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide systems and methods for automatic creation of a formatted, readable transcript of multimedia content, which is derived, extracted, determined, or otherwise identified from the multimedia content. The formatted, readable transcript can be utilized to increase accuracy and efficiency in search engine optimization, as well as identification of relevant digital content available for communication to a user.

15 Claims, 9 Drawing Sheets

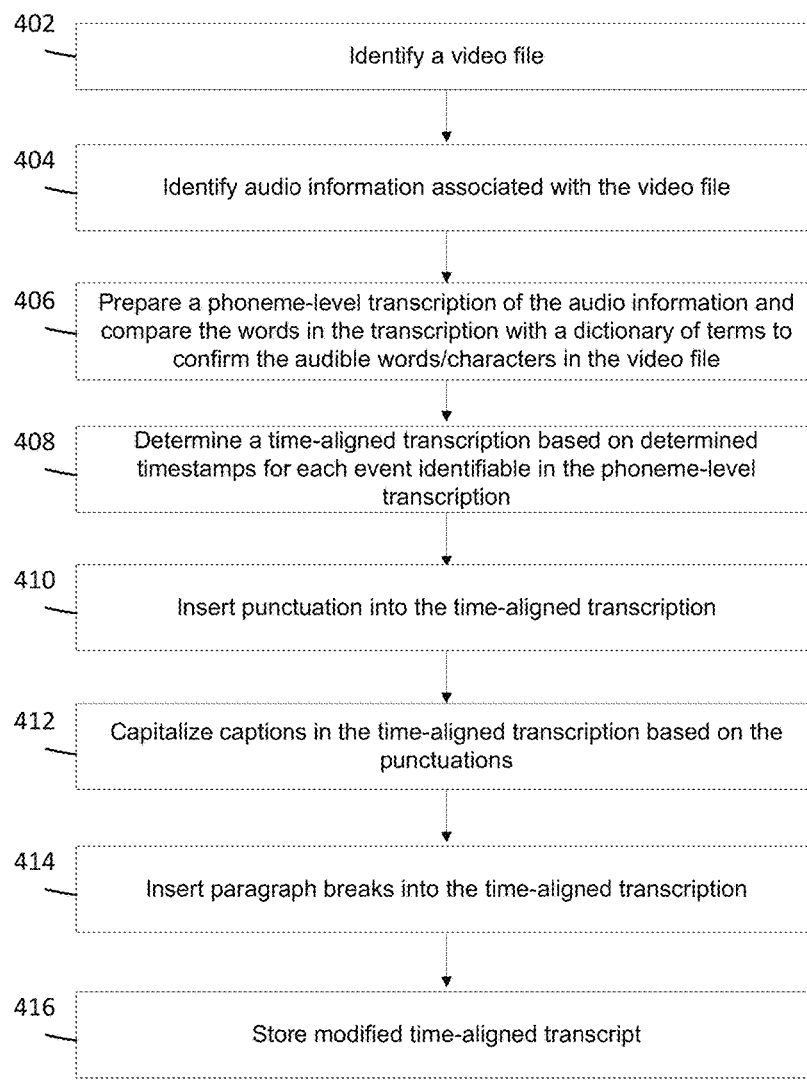

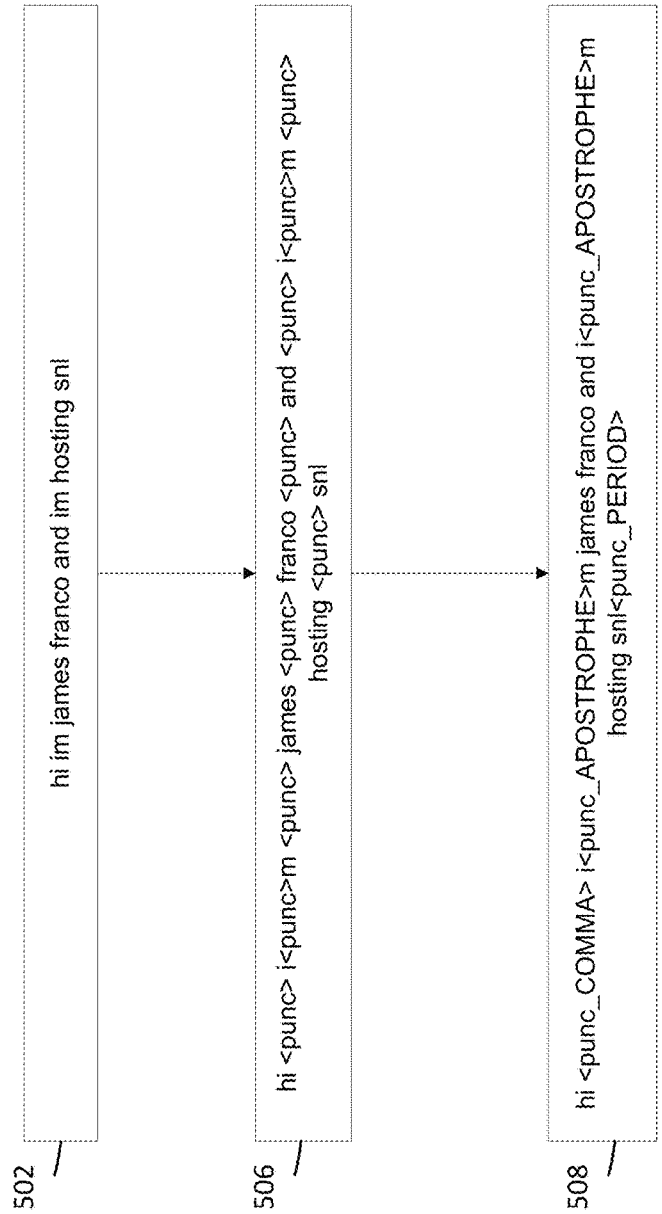

FIG. 5C

510 — hi, i'm james franco and i'm hosting snl.

512 — Hi, I'm James Franco and I'm hosting SNL.

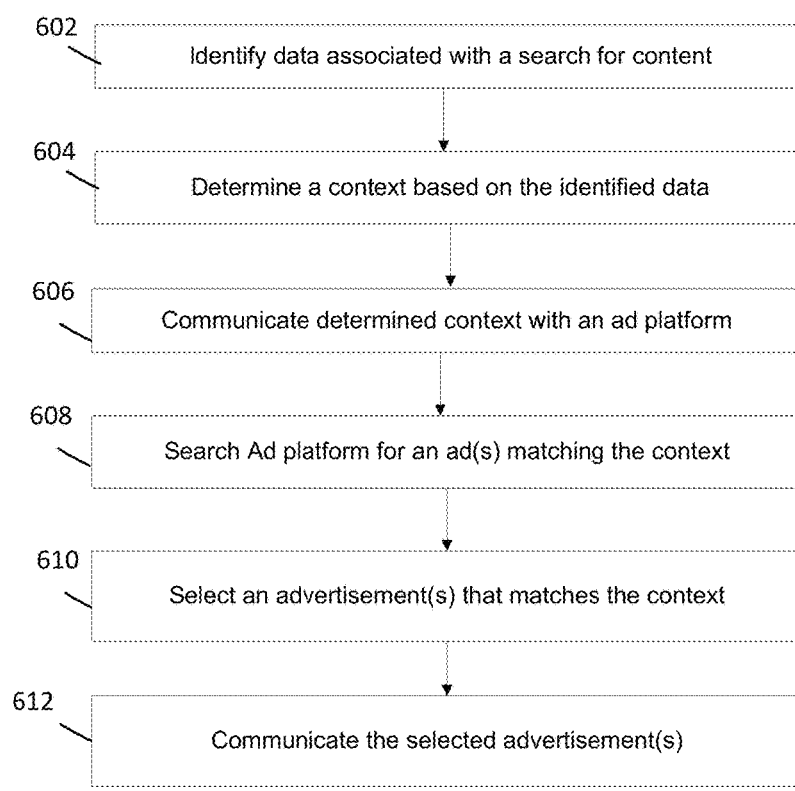

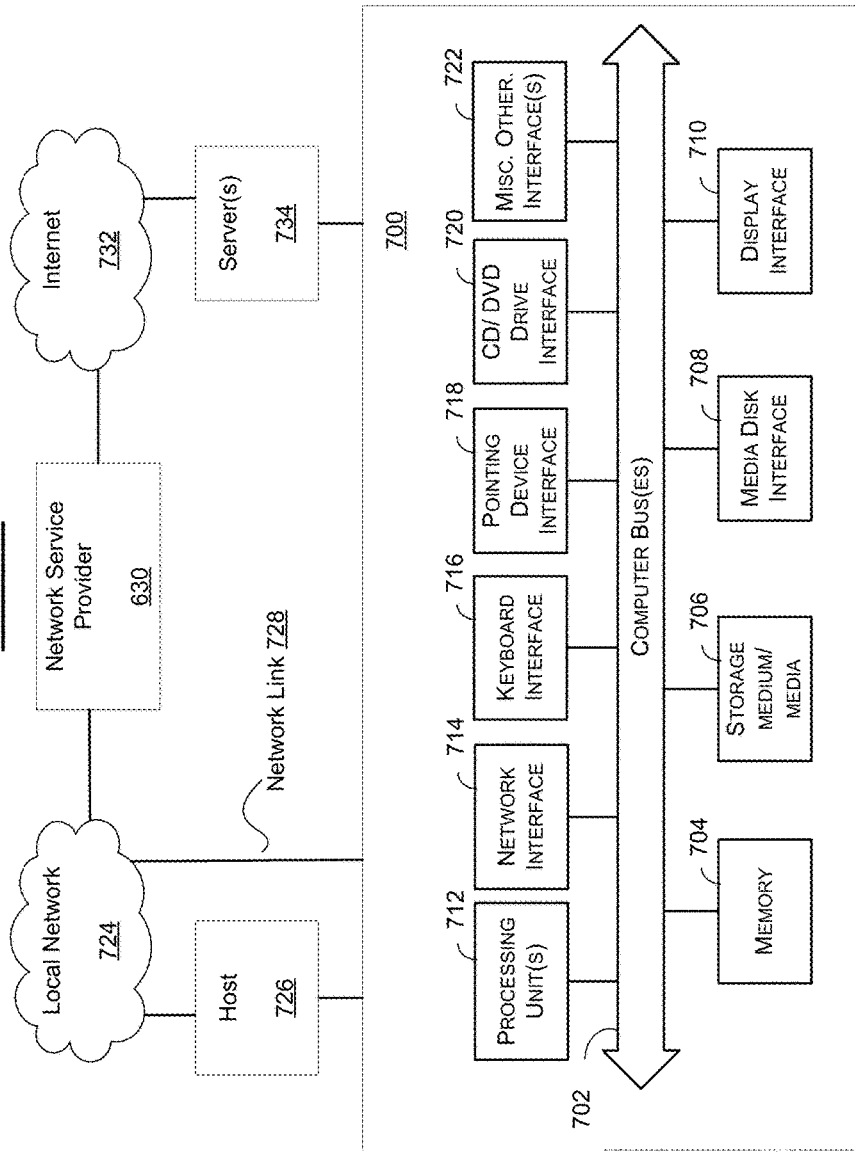

COMPUTERIZED SYSTEM AND METHOD FOR FORMATTED TRANSCRIPTION OF MULTIMEDIA CONTENT

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content searching, generating, delivery and rendering, providing and/or hosting computer systems and/or platforms by modifying the capabilities and enabling non-native functionality to such systems and/or platforms for automatic creation of a formatted, readable transcript of multimedia content.

SUMMARY

In general, the present disclosure provides systems and methods for automatically generating formatted readable transcripts for media content from closed captions, raw text, and/or ASR (automatic speech recognition) output, and the like. Conventionally, content transcriptions (or transcribing, also referred to as captions) are manually created by a professional editor, which is an expensive and time consuming process, as well as a potentially inaccurate methodology. The present disclosure provides a novel approach to transcript creation by providing systems and methods that automatically create formatted readable transcripts of multimedia content by using acoustic and lexical features extracted from the content and the raw transcription/caption files associated with the content. As discussed herein, the created transcripts can be utilized as an added feature for identifying the source content from which the transcript was created. As evidenced from the disclosure herein, this added functionality has implications that improve search engine optimization (SEO), as well as content recommendations based on such optimization, as well as content delivery in multiple formats.

In accordance with one or more embodiments, a method is disclosed which includes identifying, via a computing device, a video file; analyzing, via the computing device, the video file to identify audio data associated with the video file, the audio data comprising information associated with text corresponding to speech that is to be rendered contemporaneously with video data of the video file; determining, via the computing device, a phoneme-level transcription from the audio data, the determination comprising extracting the text from the audio data and compiling the phoneme-level transcription based on the extracted text; determining, via the computing device, a timestamp for each word in the text of the phoneme-level transcription, the timestamp indicating a time each word appears in the phoneme-level transcription; determining, via the computing device, a time-aligned transcription of the audio data based on the phoneme-level transcription and associated timestamps; automatically inserting, via the computing device, punctuation into the time-aligned transcription based on the text in the time-aligned transcription; determining, via the computing device, a character set from the text of the punctuated time-aligned transcription based on the punctuation, and automatically capitalizing the character set in the punctuated time-aligned transcription; and storing, via the computing device, a modified time-aligned transcript in association with the video file in a database, the modified time-aligned transcript comprising the punctuated and capitalized time-aligned transcription.

According to some embodiments, the method further includes determining a location for a paragraph break within the text of the modified time-aligned transcript; inserting a paragraph break in the modified time-aligned transcript at the location; and updating the modified time-aligned transcript according to the paragraph insertion in the database. In some embodiments, the location determination includes determining a topic shift among the text of the modified time-aligned transcript based on an applied hyponymy algorithm, wherein the paragraph break is further based on the topic shift determination.

It will be recognized from the disclosure herein that embodiments provide improvements to a number of technology areas, for example those related to systems and processes that perform content retrieval, as well as those systems that rely SEO, such as but not limited to, search engines, electronic social networks, e-mail or other types of messaging platforms, and/or any other type of content hosting platform existing on the internet. Additionally, the disclosed systems and methods can have a substantial impact on digital content providing, such as advertising, as the generated transcripts can be utilized as a basis for identifying other forms of digital content related to the source content from which the transcript was generated. The disclosed systems and methods can effectuate new mechanisms for providing content to users that provide increased speed and efficiency in serving or otherwise providing content to users, in addition to an increased contextual relevancy regarding displayed results of a content search. The disclosed systems and methods can leverage the additional information provided from the generated transcripts of digital content in order to provide a more accurate, efficient and personalized experience for users consuming content (e.g., media content).

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatic creation of a formatted, readable transcript of multimedia content.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 is a flowchart illustrating steps performed in accordance with some embodiments of the present disclosure;

FIGS. 5A-5C illustrate non-limiting examples according to some embodiments of the present disclosure;

FIG. 6 is a flowchart illustrating steps performed in accordance with some embodiments of the present disclosure; and FIG. 7 is a block diagram illustrating architecture of an exemplary hardware device in accordance with one or more embodiments of the present disclosure.

DESCRIPTION OF EMBODIMENTS

Figure 1:
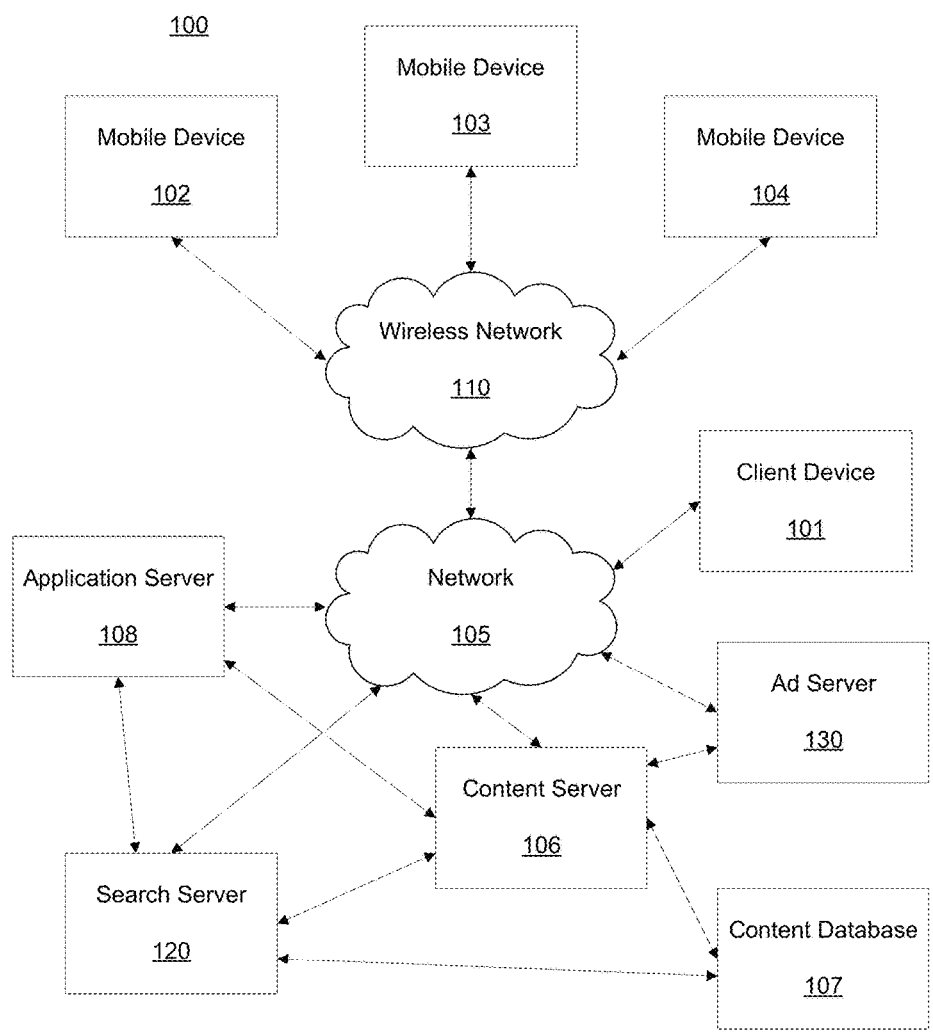
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a smart phone, phablet or tablet may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. By way of background, multimedia content such as video and audio files can be supplemented with closed captions for accessibility. Captioning multimedia content is typically a two-step process: 1) a user manually transcribes the content to obtain text and non-speech events (e.g., applause), and 2) such transcription is temporarily aligned with the content to produce closed captions.

Closed captions and transcripts provide an ability to make multimedia content accessible to user in varying situations—e.g., accessible to people with hearing impairments, or those who do not have the ability to hear the audio—such as those watching television in a restaurant. Closed captions/transcripts can also improve the "searchability" of the content, assist in video classification, and video segmentation, and provide functionality for highlighting salient objects in a video frame; however conventional content providing and hosting systems do not take advantage of such capabilities. Although closed captions can be very useful within the scope of the current technological environment, the expense and time-consuming nature associated with the traditional approach has rendered any advantages realizable from them too costly and/or unavailable. In fact, conventional transcription systems require multiple rounds of manual transcription and alignment. Even after this, while the captions may be accurate, manual time alignments are typically perceptibly "off".

Additionally, most search engine operators do not index closed caption files, as such operators only index text made visible in a web page. Therefore, in order for multimedia content to be treated as "first-class" web content, it must be accompanied by visible transcripts. However, conventional methodologies for preparing content transcripts have resulted in poor-quality transcripts; that is, conventional transcripts of media content that appear "spammy"—or comprising big blocks of text and long, run-on sentences without any punctuation or capitalization.

The present disclosure addresses these and other shortcomings by providing systems and methods that can take a raw transcription of a video (e.g. crowd-sourced or Automatic Speech Recognition (ASR) output) as input and automatically generate accurate, time-aligned, readable and formatted transcripts that include punctuation, capitalization, and paragraph segmentation. The disclosed automatic transcription results in considerable time and money being saved (from conventional systems), and more multimedia content can be made accessible and searchable through implementations of the disclosed systems and methods. As discussed in more detail below, the disclosed systems and methods leverage the combination of textual and acoustic features of media content in order to obtain higher accuracy transcripts, which can be utilized to improve the functionality of any content-enabled space on the internet.

The disclosed systems and methods can be implemented for any type of content item, including, but not limited to, video, audio, images, text, and/or any other type of multimedia content. While the discussion herein will focus on video content items, it should not be construed as limiting, as any type of content or multimedia content, whether known or to be known, can be utilized as the basis for the disclosed automatic creation of a formatted, readable transcripts from such content without departing from the scope of the instant disclosure.

As discussed in more detail below at least in relation to FIG. 6, according to some embodiments, the disclosed systems and methods can turn closed captioning from an expense for a content hosting or generating entity, to a profit for purposes of monetizing media content. For example, according to some embodiments, information associated with or derived from the content item, including the formatted, readable transcript of the content item, as discussed herein, can be used for monetization purposes and targeted advertising when providing, delivering or enabling access to searchable and/or searched content, ranked content and the like. Providing targeted advertising to users associated with such discovered content can lead to an increased click-through rate (CTR) of such ads and/or an increase in the advertiser's return on investment (ROI) for serving such content provided by third parties (e.g., advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as a search engine (e.g., Yahoo! Search®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, search services, email services, photo services, web services, social networking services, news services, third-party services, audio services, video services, instant messaging (IM) services, SMS services, MMS services, FTP services, voice over IP (VOIP) services, or the like. Such services, for example a search engine and/or search platform, can be provided via the search server 120, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with a user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is, advertisers will pay higher advertising rates when they believe their ads are being placed in or along with highly relevant content that is being presented to users. Reductions in the time needed to quantify a high quality ad placement offers ad platforms competitive advantages. Thus higher speeds and/or more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a search application, blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
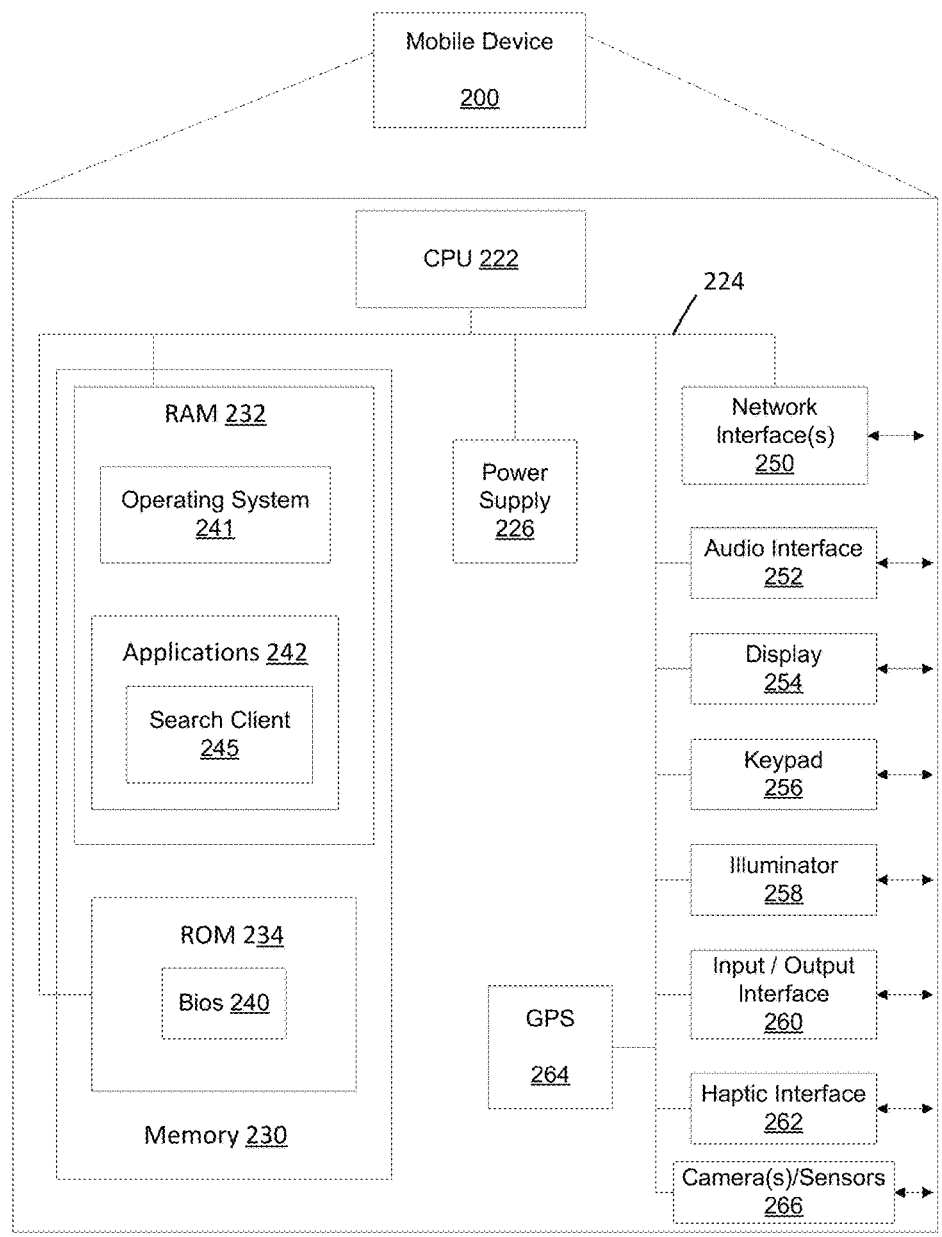
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, embodiments of the components' operation with respect to the disclosed systems and methods will now be described below.

Figure 3:
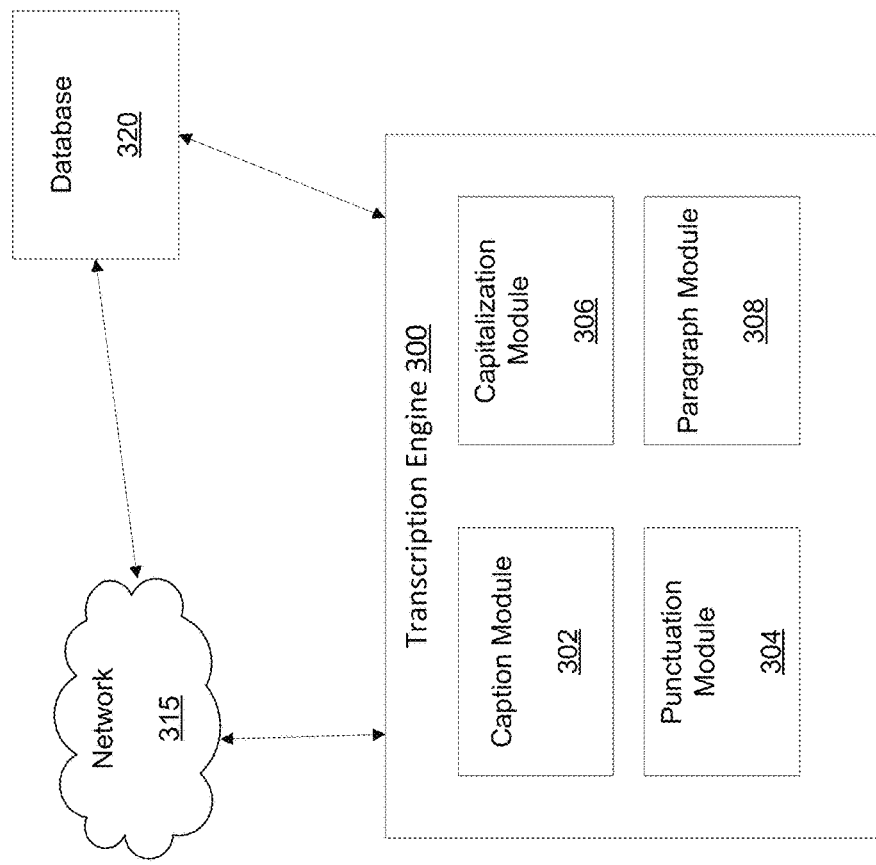
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a transcription engine 300, network 315 and database 320. The transcription engine 300 can be a special purpose machine or processor and could be hosted by an application server, content server, social networking server, web server, search server, content provider, email service provider, ad server, user's computing device, and the like, or any combination thereof. The database 320 can be any type of database or memory, and can be associated with a content server on a network (e.g., content server 106, search server 120 or application server 108 from FIG. 1) or a user's device (e.g., device 102 or device 200 from FIGS. 1-2). Database 320 comprises a dataset of data and metadata associated with local and/or network available content (e.g., video). Such information can be stored and indexed in the database 320 independently and/or as a linked or associated dataset. As discussed above, it should be understood that the content data (and metadata) in the database 320 can be any type of content information and type (e.g., video), whether known or to be known, without departing from the scope of the present disclosure.

As discussed above and in more detail below, the video data/metadata provides the basis for the raw video data (e.g., features or "functional features") of the video. Such raw video data can be directly based on the information contained in the data/metadata and associated with the content of a video; and in some embodiments, as discussed below, the raw image data can be derived from such video data/metadata.

For purposes of the present disclosure, as discussed above, videos (which are stored and located in database 320) as a whole are discussed within some embodiments; however, it should not be construed to limit the applications of the systems and methods discussed herein. That is, while reference is made throughout the instant disclosure to videos (e.g., video clips, YouTube® videos, Instagram® videos, Vine™ videos, and/or any other type of streaming or downloadable video content), other forms of user generated content and associated information, including for example text, audio, multimedia, RSS feed information can be used without departing from the scope of the instant application, which can thereby be communicated and/or accessed and processed by the transcription engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the transcription engine 300, and the database of stored resources 320. Indeed, as illustrated in FIG. 3, the transcription engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as transcription engine 300, and includes a caption module 302, punctuation module 304, capitalization module 306, and paragraph module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIGS. 4-5C.

Turning to FIG. 4, Process 400 details steps performed in accordance with exemplary embodiments of the present disclosure. Process 400 details the automatic creation of a formatted readable transcript of a video item. As discussed herein, such transcript creation is based on, at least in part, acoustic and lexical features extracted from the video file and/or the raw transcription/caption files associated with the video file. Process 400 is performed by the transcription engine 300, as discussed below.

Process 400 begins with Step 402 where a video file is identified. Step 402's identification of a video file can include identifying a video file from a database (such as database 320) which can be associated with a content hosting platform (e.g., Yahoo!®). Step 402's identification can also be based on a streaming video (e.g., YouTube® or from a Yahoo!® platform including, but not limited to Yahoo!® News, Finance, Sports, Mail, and the like). Additionally, the video file can be a user generated file that is uploaded and/or downloaded to/from the internet (such as on Tumblr®, Instagram®, Flickr®, Facebook®, Twitter®, and the like).

After the video file is identified, Step 404 involves identifying the audio information associated with the video file. Step 404 is performed by the caption module 302 of the transcription engine 300. In some embodiments, Step 404 can involve identifying an audio file (which comprises audio data) that accompanies the video file (or is associated with the video file), which may be stored in association with the video file in database 320. The audio data comprises text associated with speech that is to be contemporaneously (or synchronously) rendered while rendering the video content of the video file (so that the speech matches what is displayed). In some embodiments, Step 404 can involve parsing the video file and extracting audio data that is embedded within the video file. In some embodiments, the audio data comprises raw transcription/caption files associated with the video file. In some embodiments, Step 404 can involve executing a speech recognition technique or algorithm on the video file data to identify the audio data (e.g., spoken words) in the video. Any known or to be known speech recognition technology or algorithm can be applied to the video file to extract, determine or otherwise identify or acoustically model the audio data associated with the video, including, but not limited to, Hidden Markov models, dynamic time warping (DTW), neural networks and/or deep neural networks (DNN), and the like.

Step 406 involves comparing identified audio data associated with the video file to confirm that the audible information in the audio data corresponds to understood characters/words. Step 406, which is performed by the caption module 302, involves two parts. First, determining a phoneme-level transcription from the identified audio data, and secondly comparing the phoneme-level transcription to a dictionary. In part one of Step 406, each character and/or character combination (i.e., word) identifiable from the identified audio data is extracted and compiled into the phoneme-level transcription. The extraction can be based on any known or to be known content extraction technique or algorithm that can identify words and/or characters from an audio file, including, but not limited to, a Bayes classifier, maximum-entropy and maximum-entropy Markov models (MEMM), Hidden Markov models, Conditional Markov models (CMM), and/or conditional random field (CRF) implementations, deep neural network (DNN), and the like. Additionally, any known or to be known type of open source technology can be used for purposes of Step 406, including, but not limited to, OpenNLP, OpenCalais, Machine Learning for Language Toolkit (Mallet), DBpedia Spotlight, Natural Language Toolkit, and the like. Therefore, based on such extraction techniques, the compiled phoneme-level transcription comprises a set (or sequence) of words constructed from the identified character combinations (and/or identifiable spaces between characters) in the audio data.

Part two of Step 406 involves comparing the identified information (from part one) to a dictionary in order to confirm the identifiable words. The dictionary can be, for example, a CMU (Carnegie Mellon University) pronunciation dictionary utilized for mapping orthopraphic/phonetic words. In some embodiments, the dictionary can be any type of grapheme-to-phoneme (e.g., sequitur) dictionary for "out of dictionary" words (e.g., ubiquitous slang or acronyms). As will be understood from the disclosure herein, the dictionary utilized in Step 406 can be used as a training corpus by the transcription engine 300 for recognizing varied pronunciations or pronunciations of words/characters.

The comparison occurring in part two of Step 406 can involve implementing any known or to be known machine learning algorithm, computational analysis, statistical analysis or technology, such as, but not limited to, vector analysis, cluster analysis, data mining, Bayesian network analysis, Hidden Markov models, artificial neural network analysis, logical model and/or tree analysis, and the like. For example, the audio data can be translated into a vector, where each node is associated with a character string identifiable from the audio data. In a similar manner, words/terms from a dictionary can also be translated. Comparison of the audio vector to dictionary vector results in identification (and confirmation) of words when the similarity between the vectors (and/or their nodes) is at or above a similarity threshold.

In some embodiments, part two of Step 406 may not be performed, as only part one is required to accurately generate the phoneme-level transcription.

Next, Step 408 involves determining a time-aligned transcription of the audio information in the video file. Step 408 is performed by the caption module 302. Step 408 includes determining timestamps for an occurrence of each event identifiable from the phoneme-level transcription (from Step 406). As discussed herein, an "event" is the occurrence of audible characters, words or silence (or space—e.g., region of no speech) in the audio data. Step 408's determination of the timestamps involves comparing the phoneme-level transcription against an acoustic model via a forced alignment algorithm, such as, but not limited to the Sphinx™ toolkit for speech recognition. In some embodiments, the acoustic model may be based on a timing scheme that corresponds to the timing or length of the source video file; and in some embodiments, the acoustic model may be in accordance with the beginning and end of the audio data; or some combination thereof. The result of the timestamp determination is utilized in creating the time-aligned transcription (which can be a separate file), as the characters, words and spaces (or silences) and their associated timestamps are mapped and stored in association with each other. In some embodiments, a timestamp includes a start time and end time of a word, and in some embodiments, a timestamp includes a time for each character of each word.

In some embodiments, any known or to be known alignment technique or algorithm can be utilized without departing from the scope of the instant disclosure. In some embodiments, the acoustic model includes a broadcast news model. In some embodiments, the acoustic model can be based on the dictionaries mentioned above in Step 406.

Figure 5A:
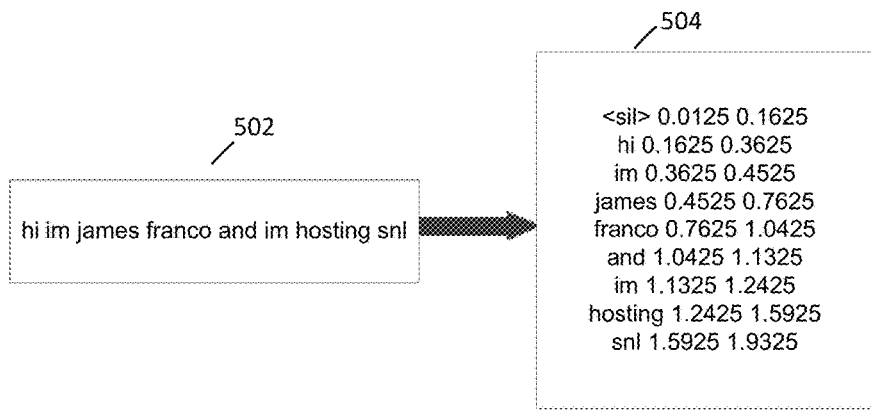

By way of a non-limiting example, as illustrated in FIG. 5A, a video of actor James Franco doing a television commercial for the TV show Saturday Night Live is the identified video. From Steps 402-406 above the audio is determined to state, as identified in item 502 of FIG. 5A: "hi im james franco and im hosting snl". From Step 408, item 504 of FIG. 5A shows the time-aligned transcription of the speech in the commercial (showing the words and the times they occur through the video). For example, "<sil> 0.0125 0.1625 shows that there is a silence until 0.1625 seconds in the beginning of the video before the speech. Next, "hi" is heard from 0.1625 until 0.3625 seconds. The rest of the speech and the timing for it can be seen in item 504 of FIG. 5A.

In some embodiments, the time-aligned transcription of the audio data of the video file can be utilized for closed captioning for the video file. That is, as above, each word/space is mapped to the video file based on each word's/space's determined timestamp. Thus, this results in time-accurate close captioning of the video file based on the created time-aligned transcription. Therefore, in such embodiments, the time-aligned transcription can be stored in database 320 in association with the source video file.

In Step 410 punctuation is inserted into the time-aligned transcription. Step 410 is performed by the punctuation module 304. As discussed herein, any known or to be known text-to-speech synthesizer (TTS) is applied to the time-aligned transcription to normalize and homogenize it. The normalized transcription is modeled according to a punctuation insertion algorithm or technology, which is trained on a corpus of well-formatted video transcriptions.

Accordingly, in some embodiments, Step 410 involves parsing the time-aligned transcription and extracting identified functional features. As understood by those of skill in the art, a functional feature can be independent of the length of the input sequence (e.g., the video or audio file), and can comprise a fixed sized vector. Non-limiting examples of such features are illustrated in the below Table:

| | |
|---|---|
| Extremes | max, min, range |
| Means | arithmetic, geometric |
| Peaks | num. peaks, distance between peaks |
| Segments | num. segments |
| Onset | num. onsets, offsets |
| Moments | st. deviation, variance |
| Crossings | zero-crossing rate, mean crossing rate |
| Percentiles | percentile values, inter-percentile ranges |
| Regression | linear and quadratic regression coefficients |
| Samples | sampled values at equidistant frames |
| Times | rise and fall of the curve, duration |
| DCT | DCT coefficients |

In some embodiments, the functional features can be utilized to detect acoustic/prosodic events of the speech in the video file, which can lead to indications of pauses, or other types of events in the audio that coincide with punctuation in the speech. This can be performed in accordance with the known or to be known TSS algorithms/techniques discussed above and/or the speech interpretation algorithms/techniques discussed below.

In some embodiments, Step 410 operates only on determined silences (or pauses) identifiable from the time-aligned transcription (e.g., pauses in natural language speech between words). In some embodiments, Step 410 can operate on words or connected terms to determine accents, and the like; however for purposes of this disclosure, Step 408 will be discussed with reference to determined silences (or no speech). It should be understood from those of skill in the art that either embodiment of Step 410 is operational, and while the discussion focuses on determined silences, it should not be viewed as limiting or narrowing to the disclosed scope of the instant disclosure.

According to some embodiments, Step 410 implements a speech interpretation algorithm or technology on the time-aligned transcription, such as, but not limited to, openSMILE to extract a predetermined number of functional features that precede each silence (or coincide with an ending string of characters in the transcription). For example, the number of functional features can be 12, as listed in the above Table. The speech interpretation technology (utilizing openSMILE for reference purposes only, as any known or to be known interpretation algorithm is applicable) computes four low level feature descriptors: 1) Energy; 2) Voicing probability; 3) Pitch Onsets; and 4) Duration. This feature extraction results in a 2268 dimensional vector, which is used to classify each silence as a punctuation mark: exclamation, question mark, period, comma, hyphen, none, and the like—where each type of punctuation is based on a range of a dimensional value within the vector associated with the determined silence.

In some embodiments, a Random Forest algorithm (such as, but not limited to, Weka) is then utilized for cross-validation purposes of validating the identified feature vectors. It should be understood by those of skill in the art that besides a Random Forests algorithm, any type of known or to be known ensemble learning method for classification, regression and other task that operates by constructing a multitude of decision trees at training time and outputting the class that is the mode of the classes (classification) or mean prediction (regression) of the individual trees can be utilized without departing from the scope of the instant disclosure.

Thus, Step 410 results in punctuations being added to the time-aligned transcription, as illustrated in FIG. 5B discussed below. According to some embodiments, the punctuations are added utilizing, for example, the CRF++ toolkit (crfpp.sourceforge.net), via a sequence tagger, to insert the determined punctuations (including "none" where no punctuation is needed) between each pair of words/characters in the time-aligned transcription. In some embodiments, part-of-speech (POS) tags and tokens can be assigned to, or inserted into the time-aligned transcription and utilized for insertion of the punctuation(s). In some embodiments, POS tags can be predicted by the CLEARNLP toolkit or another equivalent known or to be known tag prediction algorithm or technology. It should be understood that reference to specific toolkits, algorithms or technologies (above or within any portion of the instant disclosure) are referenced for explanatory purposes only and should not be construed as limiting as any known or to be known similar technology can be utilized in their place without departing from the scope of the instant disclosure.

FIG. 5B shows the original time-aligned transcription, 502 (from FIG. 5A). In item 506, the locations of punctuations are identified, as referenced by the insertion of "<punc>" between words. And, in item 508, the proper/determined punctuations are inserted. For example, between the words "hi" and "im", a comma was added as designated by "<punc_COMMA>", as illustrated in item 508. Between both instances of the word "im", an apostrophe was added as designated by "<punc_APOSTROPHE>". And a period was added at the end of the sentence, as indicated by "<punc_PERIOD>"

In Step 412, the punctuated time-aligned transcription is rendered into sentence form by capitalizing the captions (or words/characters) based on the punctuations from Step 408. In Step 412, which is performed by the capitalization module 306, characters associated with specific tokens (from the POS tag assignment above) are capitalized. This is based on a determination that the character (or word as a whole) corresponds with a proper noun, named entity, beginning of a sentence (e.g., a next character after an ending sentence punctuation), and any other type of special case respective to a particular language—for example, capitalizing the "i" in "I'm". The capitalization determination occurring in Step 412 can be based on trained language models, such as, for example, the MOSES machine translation toolkit which can be trained for a predetermined period of time (e.g., one year) on news articles so as to identify proper sentence configuration respective to capitalizations.

By way of a non-limiting example, as illustrated in FIG. 5C, item 510 shows a punctuated time-aligned transcription, where a comma, two apostrophes and a period have been added. Item 510 shows the implementation of Step 412 where the proper words/characters are capitalized. Specifically, the first word of the sentence "hi" is capitalized, both instances of "i'm" are capitalized, as is the first character in the person's first and last name "James Franco". Additionally, since "snl" relates to television show, it is capitalized to "SNL".

In Step 414, paragraph insertion is added to the punctuated and capitalized time-aligned transcription. Step 414 is performed by the paragraph module 308. According to some embodiments, any known or to be known automated word sense disambiguation or textual analysis algorithm or technology that recognizes lexical relations between collections of text, such as TextTiling, can be applied to the punctuated and capitalized time-aligned transcription in order to determine where paragraphs should be inserted. The application of such algorithms enables the paragraph module 308 to detect topic shifts across sentences and insert paragraph breaks when topic shifts occur. According to some embodiments, a topic shift is detected by computing lexical similarity between adjacent groups of sentences, and these groups are scored in accordance with a lexical threshold. In some embodiments, a topic shift is detected when scores between sentences vary at or above a difference threshold. When the lexical threshold or difference threshold is satisfied—that is, when new words are determined to be introduced into a determined group of sentences, the paragraph module 306 inserts a paragraph boundary preceding this group. In some embodiments, the number of paragraph boundaries is determined by the distribution of the topic shift scores across the whole text.

In Step 416, a modified time-aligned transcript is stored in database 320. The modified time-aligned transcript comprises the punctuated, capitalized and paragraph inserted time-aligned transcript (from Steps 410-414). Storage of the modified time-aligned transcript can be in association with the video file from which it was derived, and in some embodiments, can be inserted into the video file. Step 416's storage of the modified time-aligned transcript can involve indexing the transcript in the database, at least in association with its source video file, so that it is accessible by any content-hosting, generating, providing entity, user, provider or party that is performing any type of content retrieval process.

According to some embodiments, as discussed herein, the modified time-aligned transcript can be utilized as an added feature for identifying the source content from which the transcript was created. This added functionality has implications that improve search engine optimization (SEO), as well as content recommendations based on such optimization. For example, when a search query is received and processed (e.g., a text based search or a search based on a captured image), not only is content in database 320 analyzed to determine the relevancy to the search request, but so is the associated modified time-aligned transcript. In some embodiments, the search for relevant content may be based solely on the information contained within the modified time-aligned transcript. Searching, at least based in part on the modified time-aligned transcript, enables a search to be optimized through a more scannable and skim-able content collection, as well as become more reliably searchable due to the added contextual-searchable information provided by content item's transcript (which provides an added context for identifying content).

By way of a non-limiting example, user Bob enters a search request for a video of the Super Bowl® halftime show via a search engine—such as Yahoo!® Search. Upon searching for the video, the search engine can analyze not only the videos stored in the associated database to the search engine, but can also, or alternatively, analyze the information (e.g., text) in modified time-aligned transcripts for each video in the database. The analysis of the transcripts can involve parsing each transcript and performing a context determination as to the type of information discussed (or mentioned) in the transcript. For example, the text of a video may provide an indication that the video is the halftime show based on the speech from the announcers introducing the performing act. This indication is based on the text transcribed from the audio data of the video, as discussed above in Process 400. In some embodiments, the search results can be ranked based on a similarity comparison, in that the top ranked/listed results (identified videos) are those results that have at least a transcript matching the entered search query satisfying a threshold. This comparison can be performed via similar comparison algorithms or technologies as discussed above in Process 400.

According to some embodiments, Process 400 can be also be utilized for transcription of media files which also contain non-speech events, such as, but not limited to, laughter, music, applause and generic background noise. Process 400 can address such non-speech events by detecting such events using known or to be known Chroma feature analysis and synthesis algorithms or techniques, and filtering out the data associated with such events from during original audio information identification (for example, in Step 404).

According to some embodiments of the present disclosure, information associated with the content item and/or formatted transcript, as discussed above in relation to Process 400, can be fed back to the transcription engine 300 for modeling (or training) of the information stored in database 320 via iterative or recursive bootstrapping or aggregation functionality. This can improve the accuracy of search results, ad placement, ranking (e.g., ranked results), and the like which utilize the determined transcriptions. Embodiments of the present disclosure involve the transcription engine 300 applying such recursive/bootstrapping functions utilizing any known or to be known open source and/or commercial software machine learning algorithm, technique or technology.

FIG. 6 is a work flow example 600 for serving relevant digital content associated with advertisements (e.g., advertisement content) based, at least on, the transcription of digital content, as per the discussion above related to FIGS. 3-5C. For example, in some embodiments, FIG. 6 illustrates how advertisements are served to a user based on a requested, downloaded and/or disseminated content item. According to some embodiments, the content that forms the basis of the advertisement(s) can be based on, but not limited to, the text within a transcription, text used in generating a search query, a completed search query, a program utilized in providing search results for the search query, and the like, or some combination thereof.

By way of a non-limiting example, work flow 600 includes a user entering a search for videos of the Grand Canyon. The search is performed and the results are ranked according to the most accurate results. The search and ranked results are based on the text from the transcript of the content that is searched, as discussed above. For example, the search for "Grand Canyon" videos involves analyzing the data and metadata of videos in a data repository. This data/metadata at least includes the text from the transcript. Therefore, an advertisement associated with a "Grand Canyon" video is selected based at least in part on the transcript of the "Grand Canyon" video. The ad can be displayed to the user in a variety of ways. For example, an ad may be displayed in connection with the search query entry page, in connection with the search results, emailed to the user, as a pop-up window, inserted into the video, and the like, or some combination thereof.

In Step 602, data associated with a search for content (e.g., a search result, selected result, or any other type of content retrieval, sharing or rendering process associated with a user) is identified (which can include the associated metadata). This data comprises at least information associated with a generated transcript of a video file, as discussed above with respect to FIGS. 3-5C. In some embodiments, the data can additionally or alternatively include content information associated with the source video filed from which the transcript is determined. For purposes of this disclosure, Process 600 will generally refer to data as the basis for serving an advertisement(s); however, it should not be construed as limiting, as any type of content (e.g., text, video, images, audio or other forms of media content), as well as search characters, and/or Boolean (and the like) operator(s) connecting search terms can form such basis, without departing from the scope of the instant disclosure.

In Step 604, a context is determined based on the identified data. This context forms a basis for serving advertisements related to the identified data (i.e., relating to the type of content associated with the data). In some embodiments, the context can be determined by determining a category of content the data of Step 602 represents. Thus, Step 604 can involve determining a content type associated with the identified data. In some embodiments, the identification of the context from Step 604 can occur during analysis of the data (as discussed above in relation to FIGS. 3-5C), after generation of the transcript(s), and/or after or before performing an actual search, or some combination thereof.

In Step 606, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 608, the advertisement server 130 searches the ad database for an advertisement(s) that matches the identified context. In Step 610, an advertisement is selected (or retrieved) based on the results of Step 608. In some embodiments, the selected advertisement can be modified to conform to attributes of the page, message or method upon which the advertisement will be displayed, and/or to the application and/or device for which it will be displayed. In some embodiments, the selected advertisement is shared or communicated via the application the user is utilizing to perform the search (or other process from which the data from Step 602 was identified). Step 612. In some embodiments, the selected advertisement is sent directly to each user's computing device. In some embodiments, the selected advertisement is displayed in conjunction with the results of a search on the user's device and/or within the application being used to perform the search request (or other process, as discussed above).

As shown in FIG. 7, internal architecture 700 of a computing device(s), computing system, computing platform and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   identifying, via a computing device, a video file;
   analyzing, via the computing device, the video file to identify audio data associated with the video file, said audio data comprising information associated with text corresponding to speech that is to be rendered contemporaneously with video data of the video file;
   determining, via the computing device, a phoneme-level transcription from the audio data by extracting the text from the audio data and compiling the phoneme-level transcription based on the extracted text;
   determining, via the computing device, a timestamp for each word in the text of the phoneme-level transcription, said timestamp indicating a time each word appears in the phoneme-level transcription;
   determining, via the computing device, a time-aligned transcription of the audio data based on the phoneme-level transcription and associated timestamps;
   automatically inserting, via the computing device, punctuation into the time-aligned transcription based on the text in the time-aligned transcription;
   determining, via the computing device, a character set from the text of the punctuated time-aligned transcription based on said inserted punctuation, and automatically capitalizing, based on said inserted punctuation, said character set in the punctuated time-aligned transcription;
   storing, via the computing device, a modified time-aligned transcript in association with the video file in a database, said modified time-aligned transcript comprising the punctuated and capitalized time-aligned transcription;
   determining, via the computing device, a topic shift among said text of the modified time-aligned transcript based on an applied hyponymy algorithm executed by the computing device;
   determining, via the computing device, a location for a paragraph break within the text of the modified time-aligned transcript based on said determined topic shift;
   inserting, via the computing device, a paragraph break in said modified time-aligned transcript at said determined location; and
   updating, via the computing device, said stored modified time-aligned transcript based on said insertion of the paragraph break.

2. The method of claim 1, wherein said inserting punctuation further comprises:
   parsing the time-aligned transcription and identifying a feature indicating a space between said text characters, said space associated with a natural language pause between words of said speech; and
   inserting a punctuation mark in said time-aligned transcription based on said identified feature.

3. The method of claim 1, wherein said capitalizing further comprises:
   applying a language model to said punctuated time-aligned transcription, wherein said determined character set is further based on the applied language model.

4. The method of claim 1, wherein said video file comprises video data and said audio data, wherein said audio data is extracted from said video file.

5. The method of claim 1, wherein said audio data is stored as an audio file in association with said video file in said database, wherein said identification of the audio data comprises identifying the audio file based on the identification of the video file.

6. The method of claim 1, further comprising:
   determining a set of words from the text of the phoneme-level transcription;
   comparing each word from the set to a dictionary of terms; and
   confirming each word upon said comparison satisfying a similarity threshold.

7. The method of claim 1, wherein said identification of the video file is based on a search request.

8. The method of claim 7, further comprising:
   performing a search for said video file by analyzing modified time-aligned transcripts of video files in the database.

9. The method of claim 1, further comprising:
   receiving a request for the video file;
   determining a context of the video file based on the modified time-aligned transcript associated with the video file;

causing communication, over the network, of said context to an advertisement platform to obtain an advertisement associated with said context; and communicating said identified advertisement in association with said communication of said video file.

10. A non-transitory computer-readable storage medium tangibly encoded with computer-executable instructions, that when executed by a processor associated with a computing device, performs a method comprising:

identifying a video file;

analyzing the video file to identify audio data associated with the video file, said audio data comprising information associated with text corresponding to speech that is to be rendered contemporaneously with video data of the video file;

determining a phoneme-level transcription from the audio data by extracting the text from the audio data and compiling the phoneme-level transcription based on the extracted text;

determining a timestamp for each word in the text of the phoneme-level transcription, said timestamp indicating a time each word appears in the phoneme-level transcription;

determining a time-aligned transcription of the audio data based on the phoneme-level transcription and associated timestamps;

automatically inserting punctuation into the time-aligned transcription based on the text in the time-aligned transcription;

determining a character set from the text of the punctuated time-aligned transcription based on said inserted punctuation, and automatically capitalizing, based on said inserted punctuation, said character set in the punctuated time-aligned transcription;

storing a modified time-aligned transcript in association with the video file in a database, said modified time-aligned transcript comprising the punctuated and capitalized time-aligned transcription;

determining a topic shift among said text of the modified time-aligned transcript based on an applied hyponymy algorithm;

determining a location for a paragraph break within the text of the modified time-aligned transcript based on said determined topic shift;

inserting a paragraph break in said modified time-aligned transcript at said determined location; and updating said stored modified time-aligned transcript based on said insertion of the paragraph break.

11. The non-transitory computer-readable storage medium of claim 10, wherein said inserting punctuation further comprises:

parsing the time-aligned transcription and identifying a feature indicating a space between said text characters, said space associated with a natural language pause between words of said speech; and inserting a punctuation mark in said time-aligned transcription based on said identified feature.

12. The non-transitory computer-readable storage medium of claim 10, wherein said capitalizing further comprises:

applying a language model to said punctuated time-aligned transcription, wherein said determined character set is further based on the applied language model.

13. The non-transitory computer-readable storage medium of claim 10, wherein said audio data is stored as an audio file in association with said video file in said database, wherein said identification of the audio data comprises identifying the audio file based on the identification of the video file.

14. The non-transitory computer-readable storage medium of claim 10, further comprising:

determining a set of words from the text of the phoneme-level transcription;

comparing each word from the set to a dictionary of terms; and confirming each word upon said comparison satisfying a similarity threshold.

15. A system comprising:

a processor; and a non-transitory computer-readable storage medium for tangibly storing thereon program logic for execution by the processor, the program logic comprising:

logic executed by the process for identifying a video file;

logic executed by the process for analyzing the video file to identify audio data associated with the video file, said audio data comprising information associated with text corresponding to speech that is to be rendered contemporaneously with video data of the video file;

logic executed by the process for determining a phoneme-level transcription from the audio data by extracting the text from the audio data and compiling the phoneme-level transcription based on the extracted text;

logic executed by the process for determining a timestamp for each word in the text of the phoneme-level transcription, said timestamp indicating a time each word appears in the phoneme-level transcription;

logic executed by the process for determining a time-aligned transcription of the audio data based on the phoneme-level transcription and associated timestamps;

logic executed by the process for automatically inserting punctuation into the time-aligned transcription based on the text in the time-aligned transcription;

logic executed by the process for determining a character set from the text of the punctuated time-aligned transcription based on said inserted punctuation, and automatically capitalizing, based on said inserted punctuation, said character set in the punctuated time-aligned transcription;

logic executed by the process for storing a modified time-aligned transcript in association with the video file in a database, said modified time-aligned transcript comprising the punctuated and capitalized time-aligned transcription;

logic executed by the processor for determining a topic shift among said text of the modified time-aligned transcript based on an applied hyponymy algorithm;

logic executed by the processor for determining a location for a paragraph break within the text of the modified time-aligned transcript based on said determined topic shift;

logic executed by the processor for inserting a paragraph break in said modified time-aligned transcript at said determined location; and logic executed by the processor for updating said stored modified time-aligned transcript based on said insertion of the paragraph break.

* * * * *